US012650227B2

(12) United States Patent
Hu

(10) Patent No.: US 12,650,227 B2
(45) Date of Patent: Jun. 9, 2026

(54) HYDROGEN-DRIVEN GAS TURBINE ENGINE WITH INJECTOR RING

(71) Applicant: PRATT & WHITNEY CANADA CORP., Longueuil (CA)

(72) Inventor: Tin Cheung John Hu, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/426,506

(22) Filed: Jan. 30, 2024

(65) Prior Publication Data

US 2024/0263783 A1 Aug. 8, 2024

Related U.S. Application Data

(60) Provisional application No. 63/482,860, filed on Feb. 2, 2023.

(51) Int. Cl.
F23R 3/28 (2006.01)
F02C 7/22 (2006.01)

(52) U.S. Cl.
CPC . F23R 3/28 (2013.01); F02C 7/22 (2013.01)

(58) Field of Classification Search
CPC .. F23R 3/286; F23R 3/28; F23R 3/343; F23R 3/14; F02C 7/22
See application file for complete search history.

(56) References Cited

U.S. PATENT DOCUMENTS

| | | | |
|---|---|---|---|
| 4,122,670 A | 10/1978 | Reider | |
| 4,996,838 A * | 3/1991 | Melconian | F23R 3/58 |
| | | | 60/755 |
| 5,289,685 A | 3/1994 | Hoffa | |
| 8,200,410 B2 | 6/2012 | Williams et al. | |
| 9,746,185 B2 | 8/2017 | Ritland et al. | |
| 2005/0132716 A1 * | 6/2005 | Zupanc | F23R 3/286 |
| | | | 60/804 |
| 2009/0090110 A1 * | 4/2009 | Pardington | F23R 3/10 |
| | | | 60/752 |

(Continued)

FOREIGN PATENT DOCUMENTS

| | | |
|---|---|---|
| EP | 2853818 | 4/2015 |
| WO | 2018144008 | 8/2018 |

(Continued)

OTHER PUBLICATIONS

English translation of WO-2022202103 (Year: 2022).*
European Search Report for European Patent Application No. 24154144.0 mailed May 13, 2024.

*Primary Examiner* — Thomas P Burke
(74) *Attorney, Agent, or Firm* — Carlson, Gaskey & Olds, P.C.

(57) ABSTRACT

A gas turbine engine includes an annular combustion chamber and an injector ring that is configured to introduce a hydrogen and gas mixture into the combustion chamber. The injector ring may include a hydrogen manifold cavity, hydrogen feed conduits that extend off of the hydrogen manifold cavity and open into a mixing region at an axial end of the injector ring, and gas feed conduits that also open into the mixing region to supply gas that mixes with the hydrogen. The hydrogen feed conduits may be tangentially-sloped, and the gas feed conduits may be radially and tangentially sloped.

16 Claims, 3 Drawing Sheets

(56)                  References Cited

U.S. PATENT DOCUMENTS

| | | | |
|---|---|---|---|
| 2014/0260296 A1 * | 9/2014 | Patel | F02C 3/14 |
| | | | 60/776 |
| 2016/0273458 A1 * | 9/2016 | Kim | F02C 7/222 |
| 2016/0376997 A1 * | 12/2016 | Prociw | F23D 11/107 |
| | | | 60/739 |
| 2017/0211807 A1 * | 7/2017 | Graichen | F23R 3/283 |
| 2022/0099299 A1 | 3/2022 | Carrotte et al. | |
| 2023/0094199 A1 * | 3/2023 | Naik | F23R 3/06 |
| | | | 60/752 |
| 2023/0213191 A1 * | 7/2023 | Vukanti | F23R 3/28 |
| | | | 60/752 |

FOREIGN PATENT DOCUMENTS

| | | |
|---|---|---|
| WO | 2022202103 | 9/2022 |
| WO | WO-2022202103 A1 * | 9/2022 |
| WO | 2022214384 | 10/2022 |

* cited by examiner

HYDROGEN-DRIVEN GAS TURBINE ENGINE WITH INJECTOR RING

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Present gas turbine engines use liquid hydrocarbon fuels (LHF). LHF is provided through a fuel supply system and introduced into the combustor by liquid injectors. The fuel supply system and liquid injectors are designed for handling and efficient burning of the LHF. For instance, as liquid is much denser than the air (gas) it is to be mixed with, it is necessary for the liquid injectors to atomize the LHF into tiny droplets in order to facilitate more uniform burning. More recently it has been proposed to utilize hydrogen ($H_2$) as a fuel.

SUMMARY

A gas turbine engine according to an example of the present disclosure includes an annular combustion chamber and an injector ring for introducing a hydrogen and gas mixture into the combustion chamber. The injector ring may include a hydrogen manifold cavity, hydrogen feed conduits that extend off of the hydrogen manifold cavity and open into a mixing region at an axial end of the injector ring, and gas feed conduits that also open into the mixing region to supply gas that mixes with the hydrogen. The hydrogen feed conduits may be tangentially-sloped, and the gas feed conduits may be radially and tangentially sloped.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
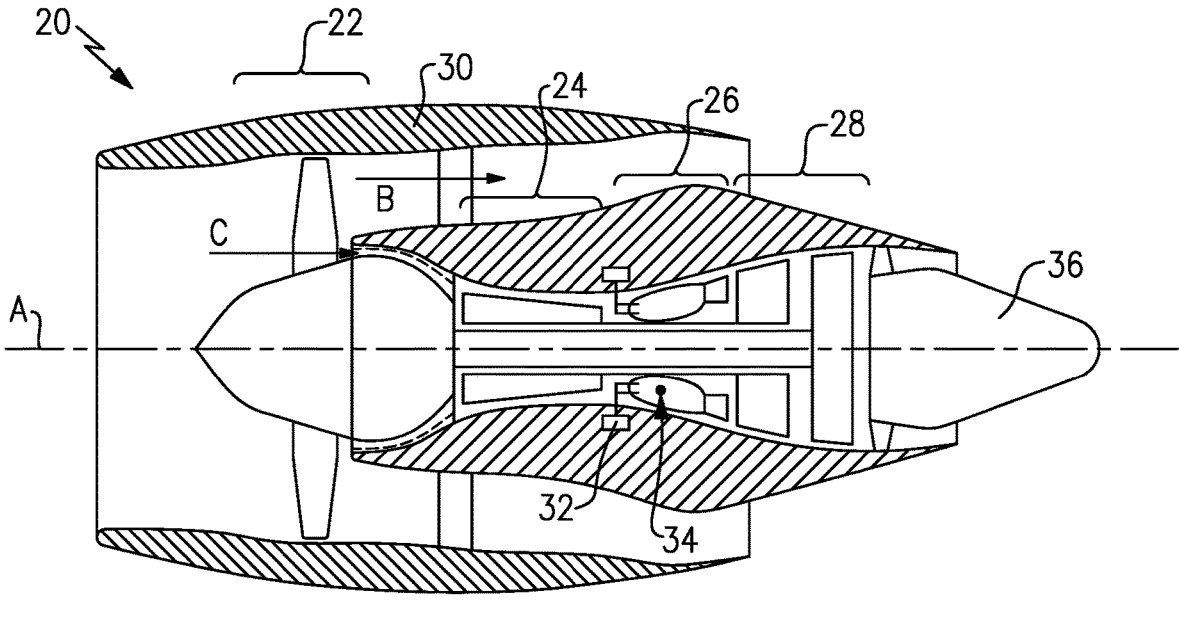
FIG. 1 illustrates a gas turbine engine.

FIG. 1 schematically illustrates a gas turbine engine 20. The example gas turbine engine 20 is a turbofan that generally incorporates a fan section 22, a compressor section 24, a combustor section 26, and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air or other combustion gas is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines, such as industrial gas turbine engines and propeller gas turbine engines where, rather than having the propulsor be an enclosed fan, the propulsor is an open propeller.

While present gas turbine engines use liquid hydrocarbon fuels (LHF), the engine 20 of the present disclosure is designed to use gaseous fuel, such as hydrogen, in the fuel system 32. The hydrogen referenced in this disclosure is assumed to be in its gaseous phase. In this regard, the fuel system 32 may carry liquid cryogenic hydrogen or gaseous hydrogen, both of which are provided to the combustor section 26 as gaseous hydrogen. A challenge to using hydrogen is that because it is a gas, its handling and combustion properties differ from that of LHF. For instance, hydrogen does not require atomization like a liquid, and hydrogen has higher flammability and different flame characteristics than LHF. Accordingly, injector nozzles and combustors that are designed for hydrogen are needed. In these regards, the engine 20 includes a combustion system 38 that is configured for introducing the hydrogen fuel into the combustor section 26.

Figure 2:
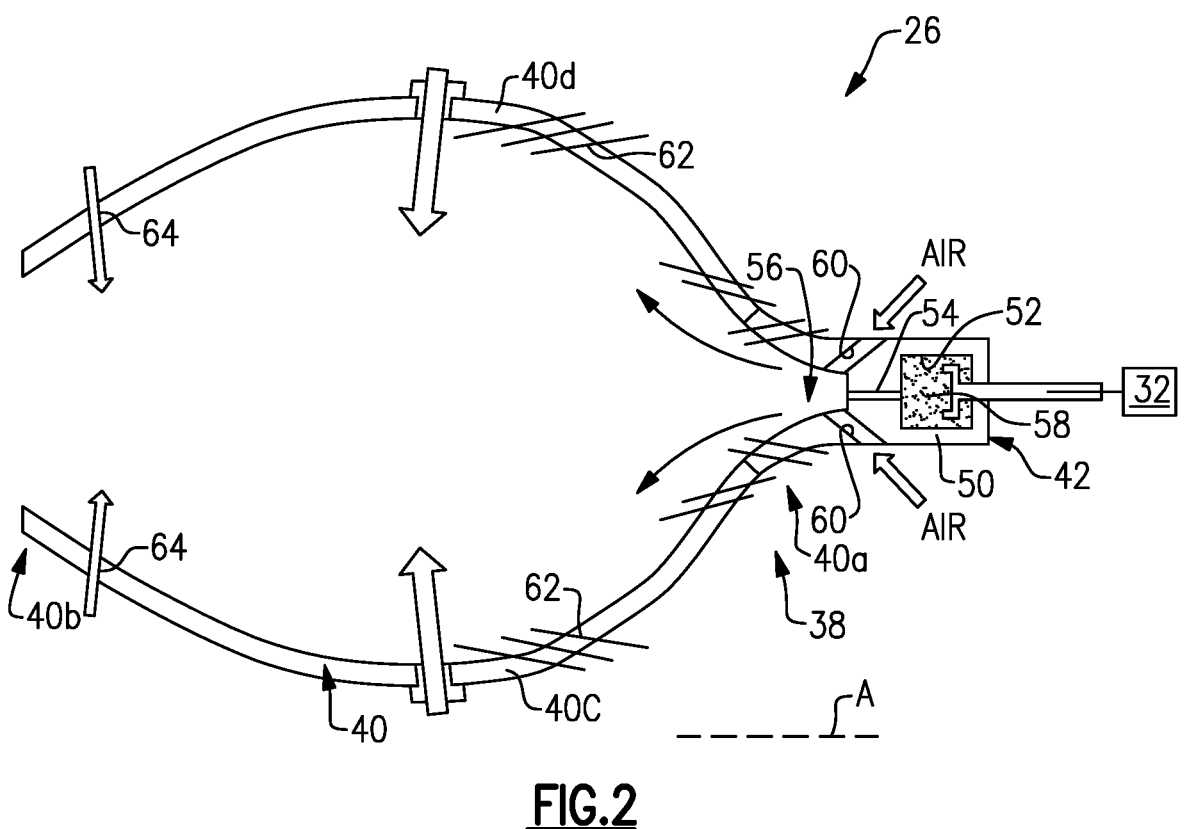
FIG. 2 illustrates the combustor section of the engine.

FIG. 2 shows a sectioned view of the combustion system 38 taken along a radial plane that includes the engine axis A (superimposed). The combustion system 38 includes a combustion chamber 40 in the combustor section 26 for introducing hydrogen and combustion gas (e.g., air in the examples herein). The combustion chamber 40 is annularly disposed about the engine axis, i.e., chamber 40 is an annulus around the axis A. The combustion chamber 40 has first and second axial ends 40a/40b and radially inner and outer walls 40c/40d. Radially "inner" and "outer" as used herein indicate radial proximity to the engine axis A.

Figure 3:
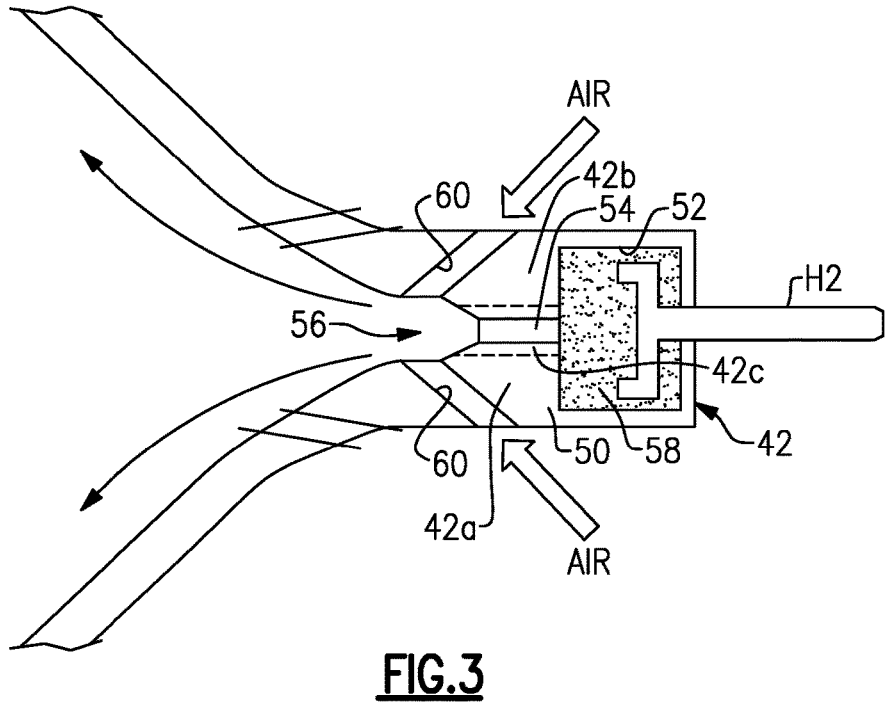
FIG. 3 illustrates an injector ring from the combustor section.

There is an injector ring 42 disposed about the engine axis A (e.g., co-axial with axis A) at the first axial end 40a that is connected to the fuel system 32 (hydrogen source) and the compressor section 24 for introducing a hydrogen and air mixture into the combustion chamber 40. As also shown in FIG. 3, the injector ring 42 includes an injector body 50 that defines a hydrogen manifold cavity 52 and hydrogen feed conduits 54 that extend off of the hydrogen manifold cavity 52 and open into a mixing region 56 at an axial end of the injector ring 42. In the illustrated example, the hydrogen manifold cavity 52 includes an open-cell metallic foam 58. For instance, the open-cell metallic foam 58 is formed of an alloy that has low susceptibility to hydrogen embrittlement, such as but not limited to, stainless steel or nickel alloy, and which is corrosion resistant and temperature resistant at the expected operating conditions. The foam 58 serves as a flame arrestor, allowing feed flow of hydrogen but facilitating the prevention of flame propagation back (flashback) through the injector ring 42. In general, flashback is prevented when the gas injection speed is higher than the local flame propagation speed.

Figure 4:
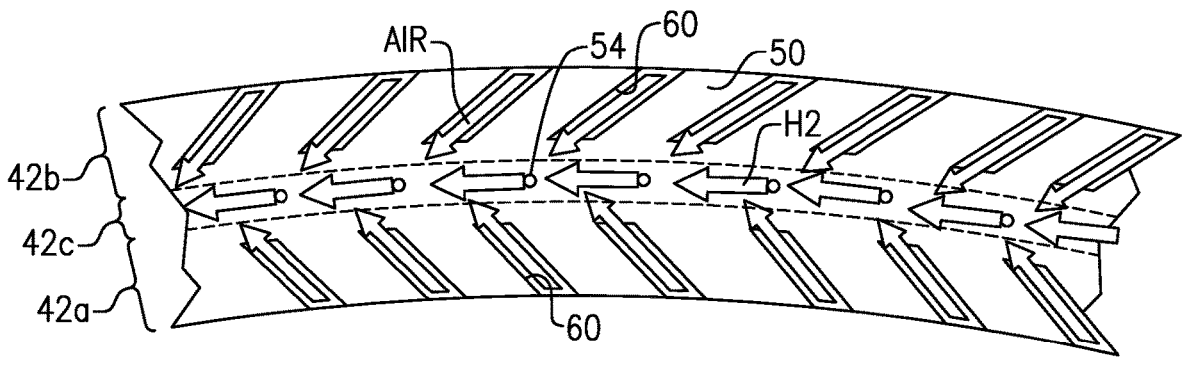
FIG. 4 illustrates an arc section of an injector ring.

FIG. 4 illustrates an axial view of a representative example arc section of the injector ring 42. The injector ring 42 includes radially inner and outer annular band sections 42a/42b and a radially intermediate annular band section 42c between the radially inner and outer annular band sections 42a/42b. The hydrogen feed conduits 54 are within the intermediate annular band section 42c and are tangentially-sloped with respect to the engine axis A. The term "tangential slope" (or variation thereof) refers to an orientation that (a) forms an oblique angle with the engine axis A and (b) lies in a plane that is (i) non-intersecting with the engine axis A and (ii) is substantially tangent to the circumference at the radial location where the conduit 54 opens to the mixing region 56. For instance, a tangential slope is in either a clockwise or counter-clockwise direction with respect to the engine axis A (looking aft). For a passage, the slope is taken with respect to the central axis of the passage at the plane of its exit. A "conduit" as used herein is defined by one or more structures that together convey a fluid from one point to another. For example, a conduit conveying fluid from point A to point B may include one of, or a combination of: a tube, an aperture defined through a part of an engine, a filter, a pump, and so on, depending on the application and context as would be understood by a person of ordinary skill in the art reading the present disclosure.

The radially inner and outer annular band sections 42a/42b include gas (air) feed conduits 60 that also open into the mixing region 56. In general, the size (at the passage exits) of all of the hydrogen feed conduits 54 are equivalent, and the size (at the conduit exit) of all of the gas feed conduits 60 are equivalent, although the sizes may differ between the hydrogen feed conduits 54 and the gas feed conduits 60. The gas feed conduits 60 are radially and tangentially sloped. The term "radial slope" (or variation thereof) refers to an orientation that has a radial angle component with respect to the engine axis A. For instance, a radial slope is either in a radially inwardly or outwardly direction with respect to the engine axis A (looking aft).

In the illustrated example, the gas feed conduits 60 in the radially inner annular band 42a are radially outwardly sloped, and the gas feed conduits 60 in the radially outer annular band are radially inwardly sloped. Additionally, the gas feed conduits 60 and the hydrogen feed conduits 54 are tangentially sloped in a common clockwise or common counter-clockwise direction (FIG. 4 is clockwise, as the figure view is axial looking forward).

The orientations of the feed conduits 54/60 facilitate good mixing of the hydrogen and air, as well as 3D circulation in the combustion chamber 40. For instance, the tangential slopes of the feed conduits 54/60 swirl the flows of hydrogen and air about the engine axis A. The radial slope of the gas feed conduits 60 directs flow of air across the face of the intermediate annular band section 42c, thereby facilitating mixing with the hydrogen and directing the mixture downstream into the combustion chamber 40.

The combustion chamber 40 may also include cooling jets 62 for introducing additional air for combustion and cooling the walls of the chamber 40, as well as downstream dilution jets 64 for further controlling stability and radial flame profile. The dilution jets 64 may also be tangentially-sloped for further swirling effect. As an example, the dilution jets 64 are tangentially sloped in the opposite direction (clockwise or counter-clockwise) of the tangential slopes of the feed passages 54/60. Such a configuration facilitates producing a counter-swirl to the bulk of the flow in the combustion chamber 40 from the injector ring 42, for more rapid uniform circumferential mixing. For example, the injector ring 42 may introduce approximately 15% to 25% of the air for combustion into the combustion chamber 40, and the remainder of the air may be provided by the cooling jets 62 and dilution holes 65.

This combustion chamber 40 may also work for lean-burn combustion system. For example, approximately 60% to 80% of the combustion air can be introduced through the injector ring 42 into the combustion chamber 40. The remainder of the air can be used for the combustor exit temperature profile trimming through dilution or profile trimming jets 64.

Figure 5:
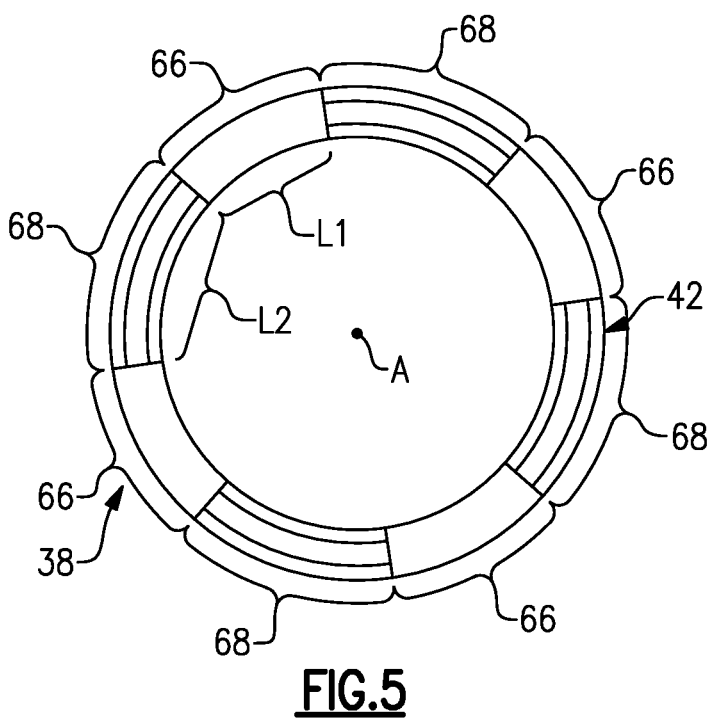
FIG. 5 illustrates an axial view of the injector ring.

FIG. 5 illustrates an example configuration of the combustion system 38 for fuel staging. For instance, the injector ring 42 is comprised of arc sections 66/68 that serve, respectively, as pilot sections and main sections. The sections 66/68 circumferentially alternate such that each of the pilot sections 66 is circumferentially between two of the main sections 68 and each of the main sections 68 is circumferentially between two of the pilot sections 66. In these regards, the pilot sections 66 each have first arc length (L1) about the axis A, the main sections 68 each have a second arc length (L2) about the axis A, and the first arc length L1 is smaller than the second arc length L2. Such a configuration may also facilitate control of power output, widening of the flame stability envelope, and thermoacoustic stability.

The pilot sections 66 introduce a first percentage of the hydrogen and air mixture into the combustion chamber 40, and the main sections 68 introduce a second percentage of the hydrogen and air mixture into the combustion chamber. In general, the pilot sections 66 are used for engine starting, flame stability, and power level controls. In these regards, the percentage of the hydrogen and air mixture provided by the pilot sections 66 versus the percentage provided by the main sections 68 may be adjusted based on engine performance. The stoichiometric ratios of the hydrogen and air in the mixtures provided by the sections 66/68 may also be adjusted for further control over engine performance. For example, an engine controller may control the percentage and ratios in accordance with a control schedule, such as a lookup table. The fuel system 32 may include valves, flow meters, and other known flow control devices that are configured to be operated by the controller in response to the control schedule to control flow of hydrogen and air.

This disclosure may be further understood in view of the following examples. A gas turbine engine 20 according to an example of the present disclosure includes an annular combustion chamber 40 disposed about an axis A, first and second axial ends 40a/40b, and radially inner and outer walls 40c/40d, and an injector ring 42 disposed about the axis A at the first axial end 40a for introducing a hydrogen and gas mixture into the combustion chamber 40.

In a further example of the foregoing example, the injector ring 42 includes a hydrogen manifold cavity 52 and hydrogen feed conduits 54 that extend off of the hydrogen manifold cavity 52 and open into a mixing region 56 at an axial end of the injector ring 42.

In a further example of any of the foregoing examples, the hydrogen manifold cavity 52 includes an open-cell metallic foam 58.

In a further example of any of the foregoing examples, the injector ring 42 includes radially inner and outer annular band sections 42a/42b, a radially intermediate annular band section 42c between the radially inner annular band section 42a and the radially outer annular band section 42b, and the hydrogen feed conduits 54 are within the intermediate annular band section 42c.

In a further example of any of the foregoing examples, the hydrogen feed conduits 54 are tangentially-sloped.

In a further example of any of the foregoing examples, the radially inner and outer annular band sections 42*a*/42*b* include gas feed conduits 60 that open into the mixing region 56.

In a further example of any of the foregoing examples, the gas feed passages 60 are radially and tangentially sloped.

In a further example of any of the foregoing examples, the gas feed passages 60 in the radially inner annular band section 42*a* are radially outwardly sloped, and the gas feed passages 60 in the radially outer annular band section 42*b* are radially inwardly sloped.

In a further example of any of the foregoing examples, the gas feed passages 60 and the hydrogen feed passages 54 are tangentially sloped in a common clockwise or common counter-clockwise direction.

In a further example of any of the foregoing examples, the injector ring 42 includes pilot injector arc sections 66 for introducing a first percentage of the hydrogen and gas mixture into the combustion chamber 40 and main injector arc segments 68 for introducing a second percentage of the hydrogen and gas mixture into the combustion chamber 40.

In a further example of any of the foregoing examples, the pilot injector arc segments 66 and the main injector arc segments 68 circumferentially alternate such that each of the pilot injector arc segments 66 is circumferentially between two of the main injector arc segments 68 and each of the main injector arc segments 68 is circumferentially between two of the pilot injector arc segments 66.

An example gas turbine engine according to an example of the present disclosure includes a combustor section 26 that has a combustion chamber 40 disposed about an axis A, first and second axial ends 40*a*/40*b*, and radially inner and outer walls 40*c*/40*d*, hydrogen source 32, and an injector ring 42 disposed about the axis A at the first axial end 40*a* and configured to introduce a hydrogen and gas mixture into the combustion chamber 40. The injector ring 42 includes a hydrogen manifold cavity 52 and hydrogen feed passages 54 that extend off of the hydrogen manifold cavity 52 and open into a mixing region 56 at an axial end of the injector ring 42, an open-cell metallic foam 58 disposed in the hydrogen manifold cavity 52, radially inner and outer annular band sections 42*a*/42*b*, a radially intermediate annular band section 42*c* between the radially inner annular band section 42*a* and the radially outer annular band section 42*b*, the hydrogen feed passages 54 being within the intermediate annular band section 42*c*, and gas feed passages 60 in the radially inner and outer annular band sections 42*a*/42*b* that open into the mixing region 56.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
an annular combustion chamber disposed about an axis and having a first axial end, a second axial end, a radially inner wall, and a radially outer wall; and
an injector ring disposed about the axis at the first axial end for introducing a hydrogen and gas mixture into the annular combustion chamber, the injector ring including a hydrogen manifold cavity and hydrogen feed conduits that extend off of the hydrogen manifold cavity and open into a mixing region, the hydrogen manifold cavity including an open-cell metallic foam, the injector ring including pilot injector arc segments extending between discrete pilot injector arc end boundaries for introducing a first percentage of the hydrogen and gas mixture into the combustion chamber and main injector arc segments extending between discrete main injector arc end boundaries for introducing a second percentage of the hydrogen and gas mixture into the combustion chamber, the pilot injector arc segments and the main injector arc segments circumferentially alternating such that each of the pilot injector arc segments is circumferentially between two of the main injector arc segments and each of the main injector arc segments is circumferentially between two of the pilot injector arc segments.

2. The gas turbine engine as recited in claim 1, wherein the injector ring includes a radially inner annular band section, a radially outer annular band section, a radially intermediate annular band section between the radially inner annular band section and the radially outer annular band section, and the hydrogen feed conduits are within the radially intermediate annular band section.

3. The gas turbine engine as recited in claim 2, wherein the hydrogen feed conduits are tangentially-sloped.

4. The gas turbine engine as recited in claim 3, wherein the radially inner annular band section and the radially outer annular band section include gas feed conduits that open into the mixing region.

5. The gas turbine engine as recited in claim 4, wherein the gas feed conduits are radially and tangentially sloped.

6. The gas turbine engine as recited in claim 5, wherein the gas feed conduits in the radially inner annular band section are radially outwardly sloped, and the gas feed conduits in the radially outer annular band section are radially inwardly sloped.

7. The gas turbine engine as recited in claim 6, wherein the gas feed conduits and the hydrogen feed conduits are tangentially sloped in a common clockwise or common counter-clockwise direction.

8. A gas turbine engine comprising:
a combustor section having a combustion chamber disposed about an axis and having a first axial end, a second axial end, a radially inner wall, and a radially outer wall;
hydrogen source; and
an injector ring disposed about the axis at the first axial end and configured to introduce a hydrogen and gas mixture into the combustion chamber, the injector ring including
a hydrogen manifold cavity and hydrogen feed conduits that extend off of the hydrogen manifold cavity and open at a mixing region,
an open-cell metallic foam disposed in the hydrogen manifold cavity such that the hydrogen feed conduits are downstream from the hydrogen manifold cavity, downstream from the open-cell metallic foam, and upstream from the mixing region, a radially inner annular band section and a radially outer annular band section, a radially intermediate annular band section between the radially inner annular band section and the radially outer annular band section, the hydrogen feed conduits being within the radially intermediate annular band section, gas feed conduits in the radially inner annular band section and the radially outer annular band section that open at the mixing region, and pilot injector arc segments extending between discrete pilot injector arc end boundaries for introducing a first percentage of the hydrogen and gas mixture into the combustion chamber and main injector arc segments extending between discrete main injector arc end boundaries for introducing a second percentage of the hydrogen and gas mixture into the combustion chamber, the pilot injector arc segments and the main injector arc segments circumferentially alternating such that each of the pilot injector arc segments is circumferentially between two of the main injector arc segments and each of the main injector arc segments is circumferentially between two of the pilot injector arc segments.

9. The gas turbine engine as recited in claim 8, wherein the hydrogen feed conduits are tangentially-sloped.

10. The gas turbine engine as recited in claim 8, wherein the gas feed conduits are radially and tangentially sloped.

11. The gas turbine engine as recited in claim 8, wherein the gas feed conduits in the radially inner annular band section are radially outwardly sloped, and the gas feed conduits in the radially outer annular band section are radially inwardly sloped.

12. The gas turbine engine as recited in claim 1, wherein the hydrogen manifold cavity is annular.

13. The gas turbine engine as recited in claim 1, wherein each of the pilot injector arc segments defines a first arc length about the axis, each of the main injector arc segments defines a second arc length about the axis, and the first arc length is less than the second arc length.

14. The gas turbine engine as recited in claim 1, wherein the injector ring is an annular injector body and includes gas feed conduits that extend through the annular injector body, the hydrogen manifold is disposed in the annular injector body, and the hydrogen feed conduits extend through the injector body.

15. The gas turbine engine as recited in claim 14, wherein the injector ring body includes a radially inner annular band section, a radially outer annular band section, a radially intermediate annular band section between the radially inner annular band section and the radially outer annular band section, the hydrogen feed conduits extend through the radially intermediate annular band section, and each of the gas feed conduits extends through one of the radially inner band section or the radially outer band section.

16. The gas turbine engine as recited in claim 15, wherein the radially inner band section and the radially outer band section each extend axially forward of the radially intermediate band section in a direction toward the second axial end.

\* \* \* \* \*